United States Patent [19]

Sergovic et al.

[11] Patent Number: 4,555,375

[45] Date of Patent: Nov. 26, 1985

[54] METHOD AND APPARATUS FOR IN MOLD COATING

[75] Inventors: John A. Sergovic, Severna Park; John L. McClinton, Hanover, both of Md.

[73] Assignee: Burns & Russell Company, Baltimore, Md.

[21] Appl. No.: 558,883

[22] Filed: Dec. 7, 1983

[51] Int. Cl.⁴ .......................... B29C 5/00; B29C 1/06
[52] U.S. Cl. ...................................... 264/259; 249/83; 249/91; 249/142; 249/175; 264/279; 264/DIG. 57
[58] Field of Search ......... 264/36, 259, 279, DIG. 57; 249/175, 83, 91, 142

[56] References Cited

U.S. PATENT DOCUMENTS

| 17,222 | 7/1907 | Ducker | 249/83 |
|---|---|---|---|
| 1,326,246 | 12/1919 | Young | 249/83 |
| 1,592,591 | 7/1926 | Amile | 264/36 |
| 1,697,347 | 1/1929 | Covey | 249/142 |
| 2,667,664 | 2/1954 | Ferrell | 264/259 |
| 3,021,573 | 2/1962 | Benton | 264/259 |
| 3,061,888 | 11/1962 | Wadham | 264/279 |
| 3,353,220 | 11/1967 | Lenoble | 249/142 |
| 4,088,723 | 5/1978 | Norton | 264/279 |
| 4,319,661 | 3/1982 | Proudfoot | 181/286 |

FOREIGN PATENT DOCUMENTS

| 57-24233 | 2/1982 | Japan | 264/259 |

OTHER PUBLICATIONS

Soundblox Brochure, The Proudfoot Company, Inc., Greenwich, Connecticut 1982.

Primary Examiner—James Lowe
Attorney, Agent, or Firm—Cushman, Darby & Cushman

[57] ABSTRACT

A method of molding a hardened glazed surface on a building block where the block is provided with a slot in the surface to be coated includes inserting a boundary edge member through the slot after the block is placed in a mold containing the coating composition; the boundary edge member conforms closely to the shape of the slot; the molding composition is cured with the boundary edge member in place and the boundary edge member is subsequently removed by forcing the member into the slot, that is away from the surface on which the composition has been molded.

13 Claims, 4 Drawing Figures

U.S. Patent     Nov. 26, 1985     4,555,375
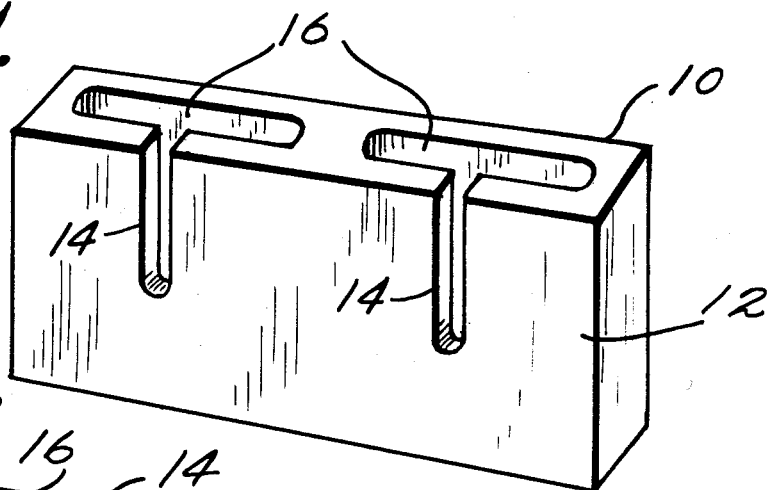
Fig. 1.
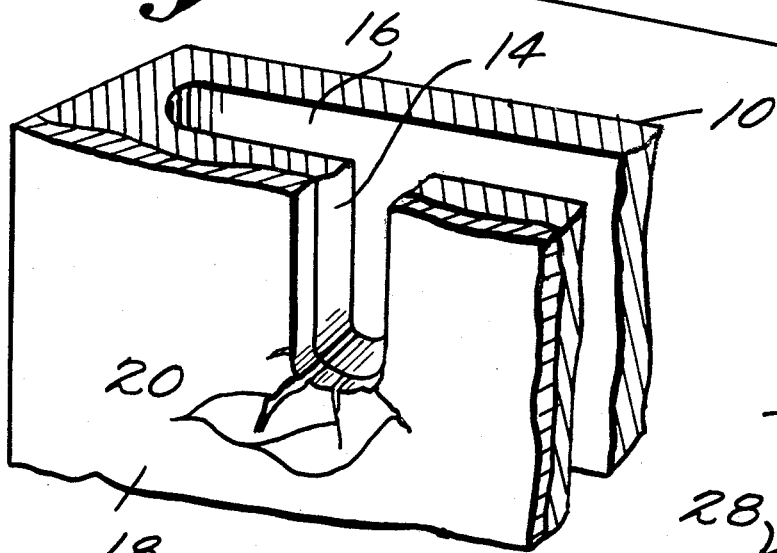
Fig. 2.
Fig. 4.
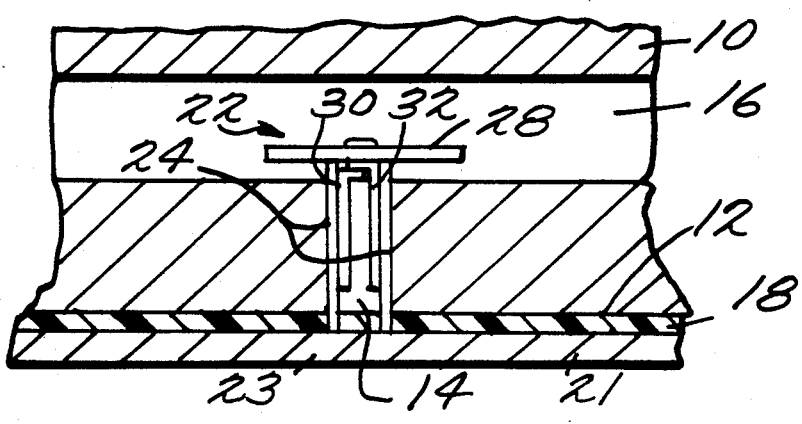
Fig. 3.

METHOD AND APPARATUS FOR IN MOLD COATING

BACKGROUND AND SUMMARY OF THE INVENTION

The present invention relates to a coating method for a building element or block of the type which has molded cavities or discontinuities in the facing surface of the block to increase the sound absorption capability of the block, commonly known as acoustical concrete block.

Coating compositions such as are disclosed in U.S. Pat. Nos. 1,761,775, 3,328,231, 3,632,725 and 4,030,289, the disclosures of which are hereby incorporated by reference and relied upon, have been successfully applied to the porous surfaces of building blocks, including cinder or concrete blocks, to impart a decorative and protective surface finish in the form of a hardened glaze to the blocks. However, it is desirous to also glaze the surface of acoustical concrete block which contain one or more sound absorbing molded cavities or discontinuities on the decorative surface. It has been found that using conventional molding systems, such as disclosed in the aforementioned patents, causes defects to occur in a large percentage of the cast decorative surfaces produced. These defects include hairline cracks in the glazed surface caused by unbalanced force vectors radiating at and surrounding the sound absorbing void or cavity on the decorative surface of the building unit. This problem occurs during the polymerization-shrinkage stage. In some circumstances, where the discontinuity is initially covered over by the coating composition and subsequently removed by cutting or the brute force of a tool, hairline cracks formed during polymerization cannot be removed and migrate into the remainder of the decorative surface. Also, with the use of brute force, additional cracking of the glaze surface has often resulted which, again, detracts from the appearance of the block as well as the performance and long term durability of the surface coating.

It is, accordingly, an object of the present invention to provide a molding method and a mold apparatus which overcomes the foregoing deficiency.

In a preferred embodiment, according to the method of the present invention, an insert member having a boundary edge closely conforming to the shape of the discontinuity in the surface of the block on which the coating composition is to be molded is provided and is employed during the curing of the resin. The insert member is inserted through the rear of the discontinuity or slot in the surface of the block and is impressed into the molding composition either while the molding composition and block are located in a molding pan such as one of those disclosed in the aforementioned U.S. patents or by pre-installing the insert in the raw block so that the block and insert are placed over the resin simultaneously. In the latter case, it is necessary to reach into the block cavity and impress the insert downward to the surface of the mold. The use of the insert to divide and separate the molding composition around the periphery of the sound absorbing voids in the face of the mold is an essential key to satisfactorily glazing an acoustical concrete block. The mechanical division of the molding compound into two surfaces at the circumference of the void prevents cracks from migrating from the unsupported compound in the void area into the supported compound in the remainder of the face of the block. This is a process of isolating the thermodynamic properties that would otherwise cause cracking. After the insert has been placed in the void so that it penetrates the molding composition, the article is then cured, and subsequent to curing, the glazed acoustical block is removed from the mold pan. Thereafter, a worker removes the insert by imparting a force to the compound in the void area of the face of the glazed acoustical block such as to drive the insert and the compound isolated by the insert down into the concrete cavity below the face of the building block. With this method and by the use of the insert, a uniform boundary or edge is provided in the glazed coating surrounding the discontinuity or opening formed in the surface of the building block.

A full appreciation of the present invention will be obtained as consideration is given to the following detailed description when taken in conjunction with the accompanying drawings, in which:

BRIEF DESCRIPTION OF THE DRAWINGS

FIG. 1 is a perspective view of an acoustic building block used with the present invention;

FIG. 2 is an enlarged view of a coated acoustic building block showing the defects encountered when a glaze composition is cured on the surface of the building block;

FIG. 3 is a section view in elevation of the building block of FIG. 1 situated in a mold with an insert member of the present invention installed in the block; and FIG. 4 is a perspective view of the insert boundary member of the present invention.

DETAILED DESCRIPTION OF THE INVENTION

Referring now to the drawings, wherein like numerals designate corresponding parts throughout the several views, there is shown in FIG. 1, building block 10 having acoustic slots cut in the facing surface 12, which slots open on the interior cavities 16 which are conventionally formed in blocks made of ciner or concrete. As is apparent from FIG. 1, the slots 14 constitute discontinuities in the surface 12 of the block 10 which permit the passage of sound waves to the interior cavity 16 which is formed with sloped walls 19 and 21 opposite slots 14 where they are absorbed thus increasing the acoustic dampening qualities of the block when such blocks are assembled in a wall structure in an enclosure.

In many structures, it is desirable to provide the blocks 10 with a glazed coating on the surface 12 both to improve the appearance of a wall utilizing such blocks as well as to provide a protective surface for the blocks as described in the aforementiond U.S. patents.

However, when such blocks have been coated with a glazing composition such as a polyester or epoxy resin, which is subsequently cured on the surface of the block, defects such as the cracks 20 in the coating composition 18 frequently occurred adjacent the discontinuity or opening in the surface 12 of the block 10.

According to the present invention, it has been found that such defects can be eliminated where an insert member is provided which extends through the opening or slot 14 during the curing of the coating composition 18. As shown, the slot 14 has a U-shape and extends from the perimeter of the surface 12 to a length that is greater than the depth of the slot.

To this end, the molding process such as described in the aforementioned patents may be employed where the molding composition in flowable form such as a paste or slurry is deposited in a mold pan 21 and distributed over the bottom of the mold pan 21. The block 10 with its surface 12 facing downwardly is then placed in the mold pan so that the surface 12 is covered with the molding composition 18. Then, an insert member 22 is placed through the opening 14 so that the lower edges 23 of the insert member 22 abut against the bottom surface of the mold pan 21 as illustrated in FIG. 3. As an alternative, the insert member 22 may be pre-placed in the block 10 and after the block is placed in the mold, the insert member 22 is then impressed downward through the resin so that it abuts against the bottom surface of the mold pan 21. The insert member 22 is, of course, shaped to define a boundary closely conforming to the inner edges of the slots 14. With the insert 22 in place as illustrated in FIG. 3, the block and mold are then subject to heat to cure the coating composition 18 to thereby form the hardened, glazed surface on the block 10. After the curing step, the block is then removed from the mold and the insert 22 removed such as by applying pressure to the exposed edges 23 to thereby force the insert member 22 through the slot 14 into the cavity 16 from which the insert may be easily manually removed. One manner of effecting the removal of the insert 22 from the slot 14 is to place a metal bar or similar object having a width sufficient to cover the adjacent lower edges 23 of the insert 22 and then the bar is struck with a hammer or similar tool to effect a clean break of legs 24 from the molding composition 18 externally thereof.

As shown in FIG. 4, the boundary insert 22 is in the form of metal plate that is bent in a U-shape having two spaced legs 24 joined at a curved portion 26 which closely conforms to the lower curved section of the slot 14. To insure accurate spacing between the legs 22, a bridge device is provided in the form of a plate 28 which lies across the top edges of the two legs 24 opposite the bottom edges 23. The plate 28 is held in place by two bracket members 30 and 32 each of which is welded to an adjacent interior surface of a leg 24. The upper portions of the brackets 30 and 32 are bent at right angles and rivets 34 are passed through the plate 28 and each bent over portion of each bracket 30 and 32. With this arrangement, the spacing between the legs 24 will be accurately maintained. Further, the plate 28 will assure that the insert member 22 does not prematurely fall through the slot 14 prior to the molding operation and handling of the block 10.

Having described the invention, it will be apparent to those skilled in this art that various modifications may be made therein without departing from the spirit and scope of this invention as defined in the appended claims.

What is claimed is:

1. A method of applying a coating composition of the type using a curable resin and a filler to the planar surface of a building article where the surface has a perimeter and a discontinuity within the perimeter, comprising the steps of:
    depositing the composition in flowable form in a mold,
    placing the surface of the building article in the mold with the composition distributed over said surface and the discontinuity therein,
    inserting boundary means having a boundary edge through said discontinuity so that said edge penetrates the composition,
    subjecting the composition to heat to cure the composition and form a hardened glaze on the surface of the article,
    removing the article from the mold, and
    removing the boundary means from the discontinuity.

2. A method of applying a coating composition of the type using a curable resin and a filler to the planar surface of a building article where the surface has perimeter and a discontinuity within the perimeter, comprising the steps of:
    depositing the composition in flowable form in a mold,
    placing boundary means having a boundary edge in said discontinuity,
    placing the surface of the building article in the mold with the composition distributed over said surface and the discontinuity therein,
    impressing the boundary means downward so that said boundary edge penetrates the composition,
    subjecting the composition to heat to cure the composition and form a hardened glaze on the surface of the article,
    removing the article from the mold, and
    removing the boundary means from the discontinuity.

3. The method as claimed in claim 1 or 2, wherein the step of removing the boundary means includes moving the boundary means into the discontinuity.

4. The method as claimed in claim 3, wherein the step of removing the boundary means includes striking the boundary means with a tool.

5. The method as claimed in claim 1 or 2, wherein the step of depositing the composition in the mold includes depositing a resin composition including polyester and a filler.

6. The method as claimed in claim 5, wherein the composition includes a plasticizer.

7. The method as claimed in claim 5, wherein the filler is sand.

8. The method as claimed in claim 7, where the sand is 50% by weight of the composition.

9. The method as claimed in claim 1 or 2, wherein the discontinuity is a slot in the surface and having a curved portion and said boundary means is a wall member shaped to fit in the slot and having along said boundary edge a section curved to conform to said curved portion, the step of inserting the boundary means including inserting said wall member into said slot with the curved section abutting the curved portion of the slot.

10. A molding apparatus, for forming a glazed surface on an article where the surface includes a discontinuity having a boundary, comprising a mold pan for receiving a molding composition and the surface of the article and a wall means insertable through the surface and conforming to the boundary of the discontinuity, said article being a building block and the surface having a perimeter, said discontinuity being a U-shaped slot extending from the perimeter of said surface, said wall means being a U-shaped plate which closely engages the slot, said slot having a length that is greater than the depth of the slot, said U-shaped plate having parallel legs and bridge means extending between said legs to maintain said legs in a fixed relation.

11. The invention as claimed in claim 10, wherein said bridge means includes a plate member that extends beyond said legs.

12. The invention as claimed in claim 11, wherein said bridge means includes a pair of support arms, each secured to a said leg respectively and connected to said plate member.

13. The invention as claimed in claim 10, wherein said wall means is made from steel plate.

* * * * *